United States Patent
Nomura et al.

(10) Patent No.: US 10,003,532 B2
(45) Date of Patent: Jun. 19, 2018

(54) COMMUNICATION METHOD AND COMMUNICATION APPARATUS

(71) Applicant: FUJITSU LIMITED, Kawasaki-shi, Kanagawa (JP)

(72) Inventors: Yayoi Nomura, Fukuoka (JP); Katsuhiko Yamatsu, Fukuoka (JP); Kenji Yamada, Onojou (JP); Yuichi Inao, Fukuoka (JP); Syunsuke Koga, Fukuoka (JP)

(73) Assignee: FUJITSU LIMITED, Kawasaki (JP)

(*) Notice: Subject to any disclaimer, the term of this patent is extended or adjusted under 35 U.S.C. 154(b) by 327 days.

(21) Appl. No.: 14/030,624

(22) Filed: Sep. 18, 2013

(65) Prior Publication Data

US 2014/0016645 A1    Jan. 16, 2014

Related U.S. Application Data

(63) Continuation of application No. PCT/JP2012/058112, filed on Mar. 28, 2012.

(30) Foreign Application Priority Data

Mar. 29, 2011    (JP) .................. 2011-073471

(51) Int. Cl.
*H04L 12/741* (2013.01)
*H04L 12/751* (2013.01)
(Continued)

(52) U.S. Cl.
CPC ............ *H04L 45/745* (2013.01); *H04L 45/02* (2013.01); *H04W 40/246* (2013.01); *H04W 84/18* (2013.01)

(58) Field of Classification Search
CPC .................................................. H04L 45/745
See application file for complete search history.

(56) References Cited

U.S. PATENT DOCUMENTS

2006/0056427 A1*  3/2006  Sato .................... H04L 12/4633
                                                         370/401
2006/0092860 A1*  5/2006  Higashitaniguchi et al.  370/255
(Continued)

FOREIGN PATENT DOCUMENTS

JP    2005-260299    9/2005
JP    2008-193543    8/2008
(Continued)

OTHER PUBLICATIONS

PCT International Preliminary Report on Patentability dated Oct. 10, 2013 in corresponding International Application No. PCT/JP2012/058112.
International Search Report dated May 29, 2012 in corresponding International Application No. PCT/JP2012/058112.

*Primary Examiner* — Shaq A Taha
*Assistant Examiner* — Manuel Rangel
(74) *Attorney, Agent, or Firm* — Staas & Halsey LLP

(57) ABSTRACT

A communication apparatus includes a receiver, a memory, a processor, and a transmitter. The receiver receives a route information frame and a first frame that is not the route information frame. The memory holds a route information table. The route information table records route information included in the route information frame. When the route information table does not include the source address of the first frame, the processor associates the source address with the address of a transfer-source apparatus that has transferred the first frame to the receiver, and registers these addresses in a registration table. In order to transmit a second frame addressed to a destination apparatus that is not recorded in the route information table, the processor obtains the address of a transfer-source apparatus registered in association with the address of the destination apparatus. The transmitter transmits the second frame to the address obtained by the processor.

5 Claims, 18 Drawing Sheets

(51) Int. Cl.
*H04W 40/24* (2009.01)
*H04W 84/18* (2009.01)

(56) References Cited

U.S. PATENT DOCUMENTS

| | | | |
|---|---|---|---|
| 2006/0184663 A1* | 8/2006 | Takahashi et al. | 709/224 |
| 2006/0268688 A1* | 11/2006 | Isozu | 370/227 |
| 2007/0025355 A1* | 2/2007 | Cohen et al. | 370/392 |
| 2008/0027897 A1* | 1/2008 | Ushiyama et al. | 707/1 |
| 2008/0186984 A1 | 8/2008 | Nakano | |
| 2008/0228940 A1* | 9/2008 | Thubert | 709/238 |
| 2008/0316951 A1* | 12/2008 | Zeng | H04L 45/00 370/312 |
| 2010/0002702 A1* | 1/2010 | Saito et al. | 370/392 |
| 2010/0111091 A1* | 5/2010 | Adams | H04L 45/04 370/395.53 |
| 2010/0142545 A1* | 6/2010 | Kurita | 370/401 |
| 2010/0260146 A1* | 10/2010 | Lu | H04L 12/4633 370/331 |
| 2011/0007669 A1* | 1/2011 | Yoon | 370/255 |
| 2011/0134797 A1* | 6/2011 | Banks et al. | 370/254 |
| 2011/0141932 A1 | 6/2011 | Iwao et al. | |
| 2011/0261706 A1* | 10/2011 | Fujiwara et al. | 370/252 |
| 2011/0261825 A1* | 10/2011 | Ichino | 370/400 |

FOREIGN PATENT DOCUMENTS

| | | |
|---|---|---|
| WO | 2009/130918 A1 | 10/2009 |
| WO | WO 2010044210 A1 * | 4/2010 |

* cited by examiner

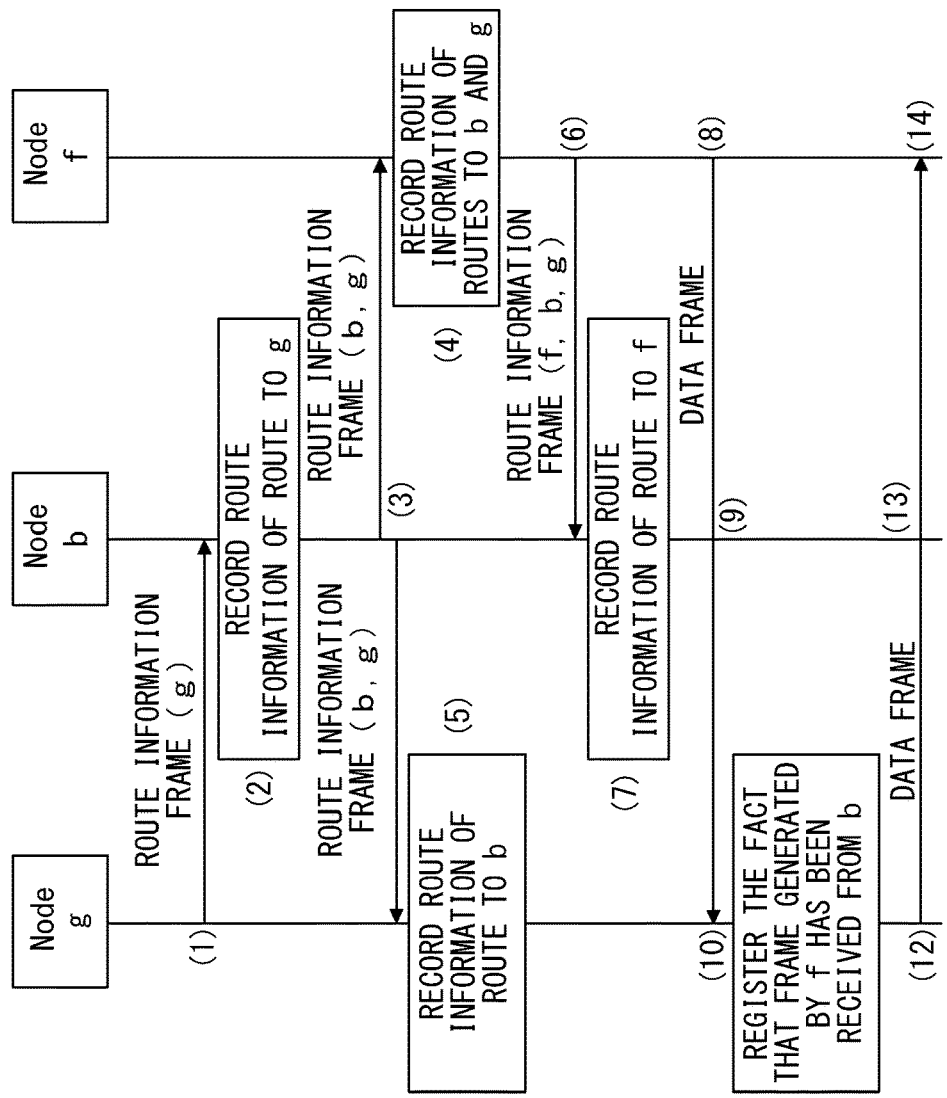
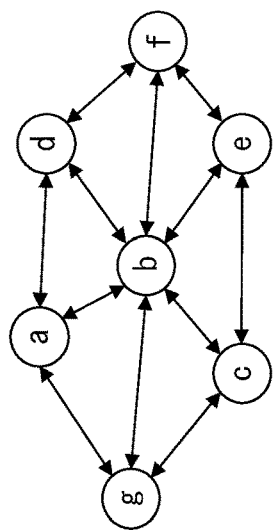
FIG. 1A
FIG. 1B

| GD | LD | QUALITY INFORMATION |
|---|---|---|
| A | A | ... |
|   | E | ... |
|   | F |   |
| B | B |   |
|   | D |   |
|   | E |   |
| ⋮ | ⋮ | ⋮ |
| C | A |   |
|   | E |   |
|   | D |   |

F I G. 3

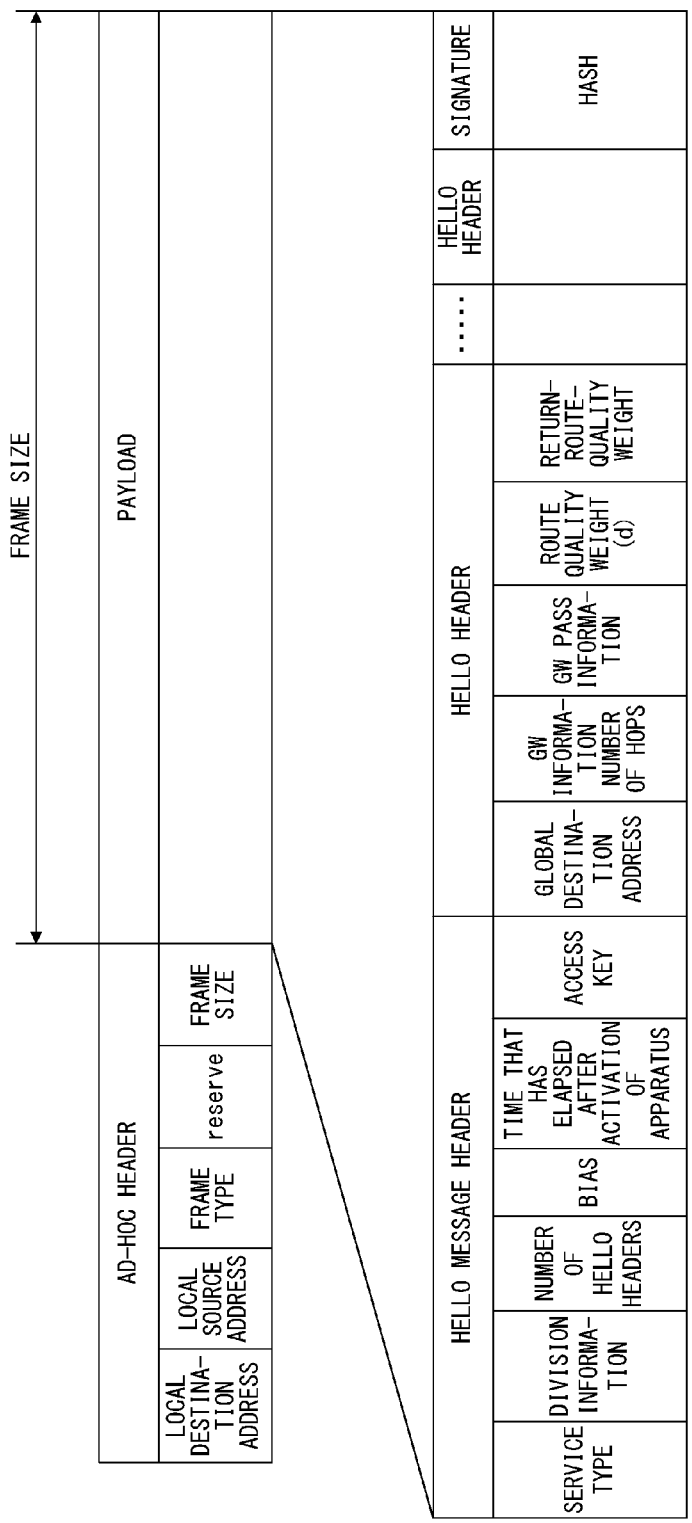
F I G. 4

| GD | LD |
|----|----|
| Z  | B  |
| ⋮  | ⋮  |
|    |    |

FIG. 6

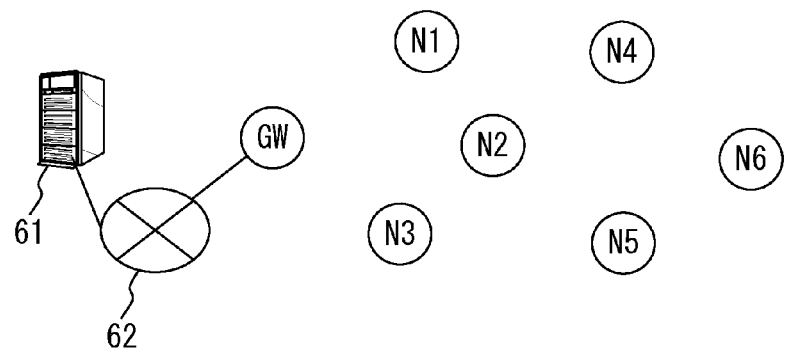
FIG. 8A
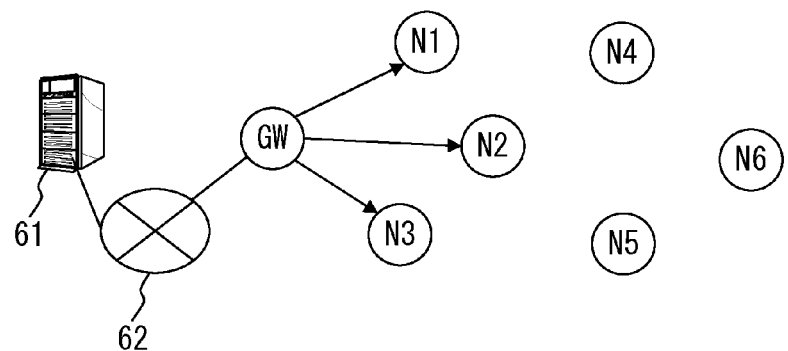
FIG. 8B
| GD | LD | NUMBER OF HOPS |
|---|---|---|
| GW | GW | 1 |
FIG. 8C

| GD | LD | NUMBER OF HOPS |
|----|----|----|
| GW | GW | 1 |
| GW | N2 | 2 |
| N2 | N2 | 1 |

| GD | LD | NUMBER OF HOPS |
|----|----|----|
| GW | N2 | 2 |
| N2 | N2 | 1 |

| GD | LD | NUMBER OF HOPS |
|----|----|----|
| N2 | N2 | 1 |

| GD | LD | NUMBER OF HOPS |
|----|----|----|
| GW | GW | 1 |
| GW | N6 | 3 |
| N6 | N6 | 1 |

| GD | LD | NUMBER OF HOPS |
|----|----|----|
| GW | N2 | 2 |
| GW | N6 | 3 |
| N2 | N2 | 1 |
| N2 | N6 | 2 |
| N6 | N6 | 1 |

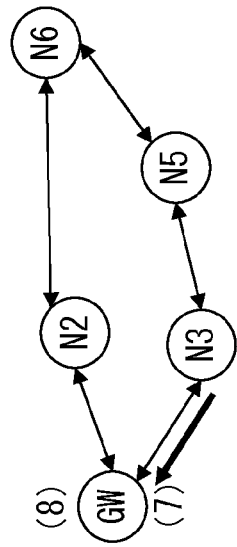
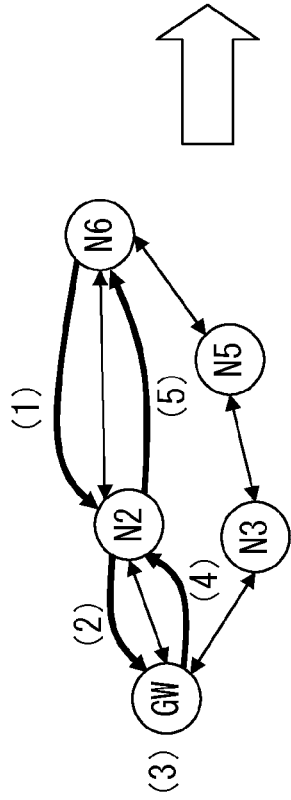
F I G. 11

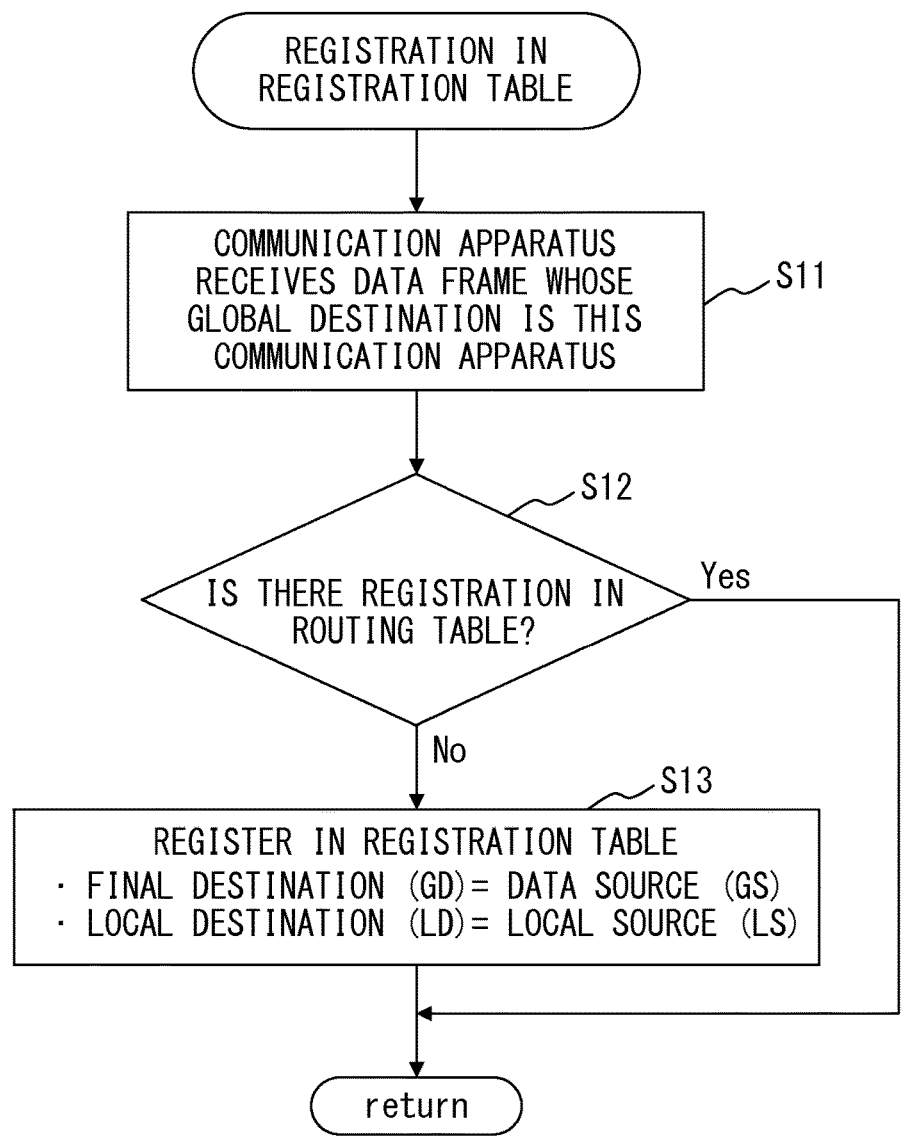
F I G. 1 3

COMMUNICATION METHOD AND COMMUNICATION APPARATUS

CROSS-REFERENCE TO RELATED APPLICATION

This application is a continuation application of International Application PCT/JP2012/058112 filed on Mar. 28, 2012 based upon the prior Japanese Patent Application No. 2011-073471 filed on Mar. 29, 2011. This continuation application also claims the benefit of priority of Japanese Patent Application No. 2011-073471. The entire contents of PCT application PCT/JP2012/058112 and Japanese Patent Application No. 2011-073471 are incorporated herein by reference.

FIELD

The embodiments discussed herein are related to a method for performing a communication via a network and to a communication apparatus that uses the method.

BACKGROUND

Ad-hoc networks are convenient since they are dynamically formed even when a communication apparatus is added to or removed from the network. Routing methods for ad-hoc networks include a plurality of types of methods such as reactive type methods and proactive type methods, and various routing protocols have been developed. The Ad hoc On-Demand Distance Vector Algorithm (AODV) is an example of a reactive-type routing protocol.

In a network that uses a reactive-type routing protocol, a routing table is created after a transmission request is generated. For example, a route controlling method has been created wherein, in searching for a route from a source apparatus to a destination apparatus, flooding is applied to a request in a direction from the source apparatus to the destination apparatus, and the destination apparatus applies flooding to a reply to the request in a direction toward the source apparatus. In this method, when a route controlling apparatus receives a request or a reply from an adjacent node, the route controlling apparatus stores the information of a route that includes the adjacent node.

Meanwhile, in a network that uses a proactive-type routing protocol, routes are determined before a communication is performed. The Optimized Link State Routing (OLSR) is an example of proactive-type routing protocols. In the using of a proactive-type protocol, apparatuses that participate in the ad-hoc network periodically transmit a Hello frame. The Hello frame includes the information of a source communication apparatus that is the source of the Hello frame and a portion of the route information stored by the source communication apparatus. Using Hello frames, apparatuses that participate in the ad-hoc network determine a route by exchanging route information of the network.

PRIOR ART DOCUMENT

Patent document

Patent document 1: Japanese Laid-open Patent Publication No. 2008-193543

As described above, in a network that uses a proactive-type routing protocol, a routing table is created before a communication is performed, and a frame is transferred using a route recorded in the routing table. That is, communication apparatuses do not transfer a frame to a communication apparatus that is not recorded in the routing table, so the transferring will fail if the destination apparatus is not recorded in the routing table.

The routing table is generated according to a Hello frame, but times at which a Hello frame is transmitted by each communication apparatus are limited, and, in addition, each individual Hello frame reports only a limited amount of route information. Thus, each individual communication apparatus disadvantageously takes time to generate a routing table that includes a record related to communication apparatuses within the entire network. Taking a long time to generate a routing table leads to a problem of a higher likelihood of a failure of the transferring or transmitting of a frame due to non-recording of a destination apparatus in the routing table.

SUMMARY

A communication apparatus in accordance with one embodiment includes a receiver, a memory, a processor, and a transmitter. The receiver receives a route information frame that reports route information of a network, and a first frame that is not a route information frame. The memory holds a route information table. The route information table records route information included in the route information frame. When the route information table does not include a source address of the first frame, the processor associates the source address with the address of a transfer-source apparatus that has transferred the first frame to the receiver, and registers the source address and the address of the transfer-source apparatus in a registration table. When the communication apparatus transmits a second frame addressed to a destination apparatus that is not recorded in the route information table, the processor obtains from the registration table the address of a transfer-source apparatus registered in association with the address of the destination apparatus. The transmitter transmits the second frame to the address obtained by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A illustrates an exemplary ad-hoc network.

FIG. 1B illustrates an exemplary communication performed in one embodiment.

FIG. 3 illustrates an example of a routing table.

FIG. 4 illustrates an exemplary configuration of a Hello frame.

FIG. 6 illustrates an example of a registration table.

FIG. 8A illustrates an example of a communication apparatus that receives a Hello frame.

FIG. 8B illustrates another example of a communication apparatus that receives a Hello frame.

FIG. 8C illustrates an example of a routing table.

FIG. 11 illustrates an exemplary situation in which data frames are transmitted and received between communication apparatuses.

FIG. 13 is a flowchart illustrating exemplary operations performed by a communication apparatus so as to register route information in a registration table.

DESCRIPTION OF EMBODIMENTS

Figure 2:
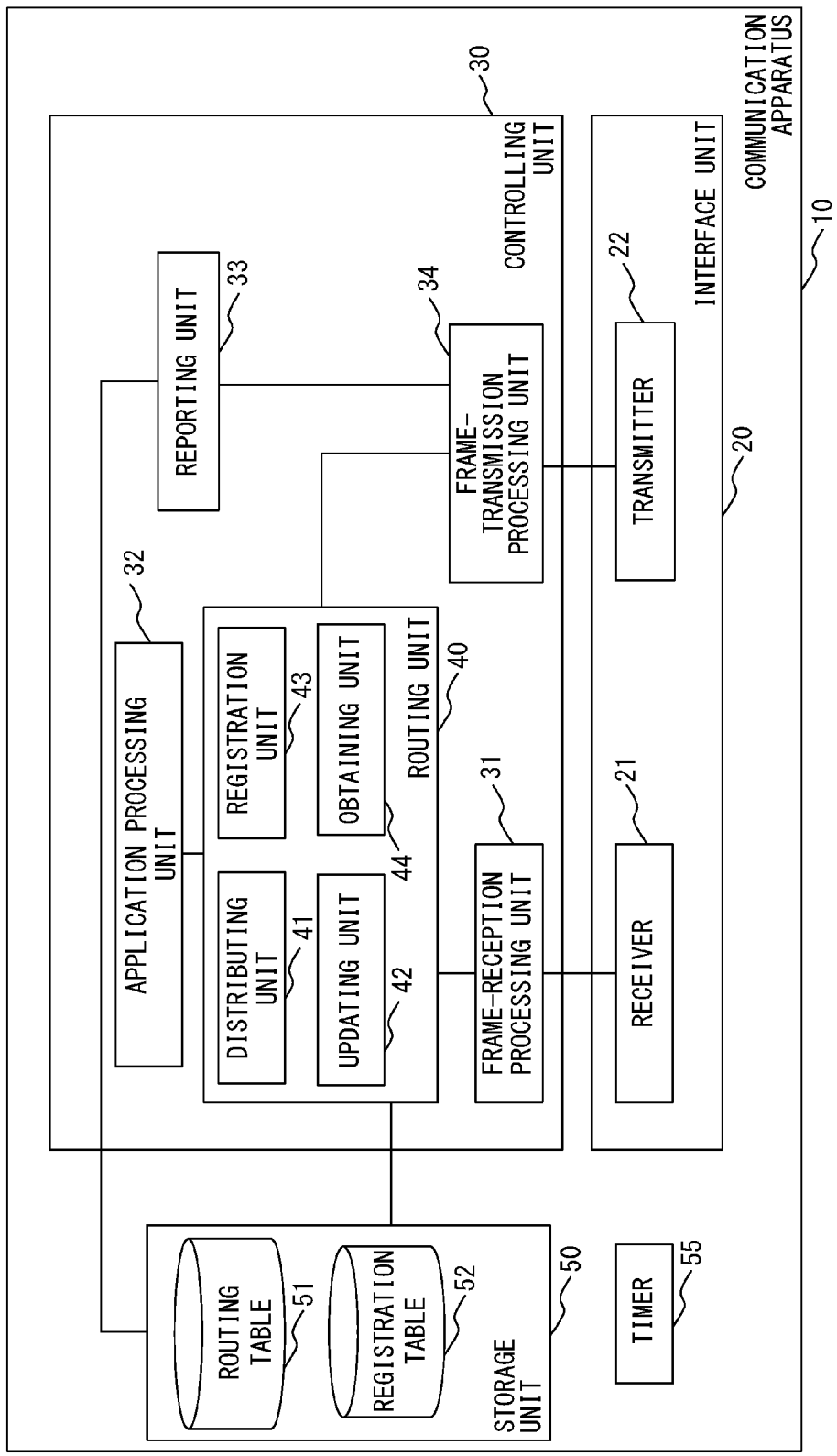
FIG. 2 illustrates an exemplary configuration of a communication apparatus.

FIG. 1A and FIG. 1B illustrate an exemplary communication performed in one embodiment. FIG. 1A depicts an exemplary ad-hoc network that includes seven communication apparatuses a to g. The communication apparatuses a to g each use a proactive-type routing protocol. In the following, descriptions will be given of an operation performed when the communication apparatuses a to g participate in the ad-hoc network and form the network. The communication apparatuses a to g each broadcast, at a timing allocated thereto, a frame that reports route information of the network.

A frame that reports route information of the network may hereinafter be referred to as a "route information frame". The route information frame may be an arbitrarily frame that is used to share route information of the network between a plurality of communication apparatuses. For example, a Hello frame is an example of the route information frame. A communication apparatus that has received the route information frame stores, in a route information table, the information of a route included in the route information frame and the information of the communication apparatus that is the source of the route information frame. The route information table, which is a table in which route information of the network is recorded, may hereinafter be referred to as a "routing table".

A "communication apparatus that is adjacent to" a certain apparatus indicates a communication apparatus located within a range which a frame or a signal transmitted from this certain apparatus reaches. As an example, the example of FIG. 1A is based on the assumption that the communication apparatuses a to c are capable of receiving a frame transmitted from the communication apparatus g but the communication apparatuses d to f are incapable of receiving the frame transmitted from the communication apparatus g. In this case, the communication apparatuses a to c are adjacent to the communication apparatus g, but the communication apparatuses d to f are not adjacent to the communication apparatus g.

FIG. 1B is a sequence diagram of an exemplary communication performed between the communication apparatuses b, f, and g. FIG. 1B, which depicts an exemplary sequence, may be varied, for example, in a manner such that the processes of procedures (6) and (7) are performed prior to the processes of procedures (3) to (5). In such a case, however, the route information frame transmitted from the communication apparatus f does not include information of the communication apparatus b or g.

(1) The communication apparatus g broadcasts a route information frame. The route information frame includes information of the communication apparatus g. At this time, the communication apparatus g has not obtained information of any of the communication apparatuses included in the ad-hoc network, so information of the communication apparatuses other than the communication apparatus g is not included in the route information frame.

(2) The communication apparatus b receives the route information frame and, according to the route information frame, recognizes that the communication apparatus g is adjacent to the communication apparatus b. The communication apparatus b records the information of the communication apparatus g in a routing table of the communication apparatus b.

(3) The communication apparatus b broadcasts a route information frame. Assume that the route information frame transmitted by the communication apparatus b has recorded therein the information of the communication apparatus b and the information indicating that the communication apparatus b is capable of transferring a frame to the communication apparatus g.

(4) The communication apparatus f receives the route information frame transmitted in procedure (3). The communication apparatus f obtains information of the communication apparatuses b and g from the route information frame and records this obtained information in a routing table.

(5) The communication apparatus g receives the route information frame transmitted in procedure (3). The communication apparatus g obtains the information of the communication apparatus b from the route information frame and records this obtained information in a routing table.

(6) The communication apparatus f broadcasts a route information frame. Assume that the route information frame transmitted by the communication apparatus f has recorded therein the information of the communication apparatus f and the information indicating that a frame is transmittable to the communication apparatuses b and g via the communication apparatus f.

(7) The communication apparatus b receives the route information frame transmitted in procedure (6) and obtains the information of the communication apparatus f. In addition, the communication apparatus b records the information of the communication apparatus f in a routing table.

(8) Assume that the communication apparatus f has generated a data frame that includes data addressed to the communication apparatus g. The communication apparatus f checks the routing table and recognizes that frames are transmittable to the communication apparatus g via the communication apparatus b. The communication apparatus f transmits the generated data frame to the communication apparatus b.

(9) Upon receipt of the data frame transmitted in procedure (8), the communication apparatus b transfers this data frame to the communication apparatus g according to the routing table.

(10) The communication apparatus g receives the data frame from the communication apparatus b.

(11) The communication apparatus g checks the source address of the data frame received in procedure (10) and recognizes that the source address of the data frame indicates the communication apparatus f. The communication apparatus g checks whether the route information of a route to the communication apparatus f is recorded in the routing table. In this example, the route information of a route to the communication apparatus f is not recorded in the routing table of the communication apparatus g. Accordingly, the communication apparatus g registers in a registration table the fact that the frame transmitted from the communication apparatus f has been received from the communication apparatus b.

(12) Assume that the communication apparatus g attempts to transmit a data frame to the communication apparatus f. The communication apparatus g checks the routing table to search for a route to the communication apparatus f, but a route to the communication apparatus f is not recorded in the routing table. Subsequently, the communication apparatus g checks whether the registration table includes a record of the reception of a frame whose source is the communication apparatus f. The fact that the frame whose source is the communication apparatus f has been received from the communication apparatus b is recorded in the registration table in procedure (11). Accordingly, the communication apparatus g determines that frames are transmittable to the communication apparatus f via the communication apparatus b, and transmits the data frame to the communication apparatus b.

(13) The communication apparatus b receives from the communication apparatus g the data frame transmitted in procedure (12). Recognizing that the destination of the received frame is the communication apparatus f, the communication apparatus b references the routing table so as to obtain a route to the communication apparatus f. In this example, the communication apparatus b transmits the frame to the communication apparatus f.

(14) The communication apparatus f receives the data frame from the communication apparatus b.

As described above, upon receipt of a first frame that is not a route information frame, the communication apparatus in accordance with the embodiment checks whether a route to the source of the first frame is recorded in a route information table. When the source of the first frame is not recorded in the route information table, the communication apparatus associates the source address of the first frame with a transfer-source address of the first frame and registers these addresses in a registration table. In addition, when the communication apparatus attempts to transmit a second frame addressed to a communication apparatus for which route information is not recorded in the route information table, the communication apparatus attempts to identify from the registration table a transfer source of a frame whose source is the destination of the second frame. When the transfer source is successfully identified, the communication apparatus transmits the second frame to the transfer source. The apparatus that has received the second frame transfers the second frame to the destination of the second frame in accordance with a route information table or a registration table which this apparatus holds.

Thus, even when a destination apparatus is not recorded in a route information table, the communication apparatus in accordance with the embodiment may transmit a frame to an apparatus that was a source of a frame that was received in the past. Accordingly, the communication apparatus in accordance with the embodiment may decrease the likelihood of a failure of the transferring or transmitting of a frame due to a non-recording of a route in a routing table.

<Apparatus Configuration>

FIG. 2 illustrates an exemplary configuration of a communication apparatus 10. The communication apparatus 10 includes an interface unit 20, a controlling unit 30, a storage unit 50, and a timer 55. The interface unit 20 includes a receiver 21 and a transmitter 22. The controlling unit 30 includes a frame-reception processing unit 31, an application processing unit 32, a reporting unit 33, a frame-transmission processing unit 34, and a routing unit 40. The routing unit 40 includes a distributing unit 41, an updating unit 42, a registration unit 43, and an obtaining unit 44. The storage unit 50 stores a routing table 51 and a registration table 52.

The receiver 21 receives a signal of a frame transmitted to the communication apparatus 10. The receiver 21 outputs the received signal to the frame-reception processing unit 31. The frame-reception processing unit 31 converts the signal input from the receiver 21 into a frame such that it can be processed by the routing unit 40. Frames obtained from the conversion by the frame-reception processing unit 31 include, for example, a route information frame, a control frame that is not a route information frame, and a data frame that stores user data. The frame-reception processing unit 31 outputs the obtained frame to the distributing unit 41. When a frame addressed to the communication apparatus 10 is input from the routing unit 40, the application processing unit 32 processes the input frame in accordance with an application. Moreover, the application processing unit 32 may generate a data frame to be transmitted to another communication apparatus 10 in accordance with an application process. The application processing unit 32 outputs the generated data frame to the distributing unit 41. The application processing unit 32 may also output the data frame to the obtaining unit 44.

The distributing unit 41 checks a frame type field within an ad-hoc header included in an input frame. The value of a frame type field is different for each type of frame, and, for example, a Hello frame and a data frame indicate different values. The distributing unit 41 may store in advance the values of frame type fields each corresponding to a type of frame that the communication apparatus 10 may possibly receive, or may obtain such values from the storage unit 50 as appropriate. The distributing unit 41 outputs a Hello frame to the updating unit 42.

For data frames, the distributing unit 41 checks a global destination (GD) address. The following descriptions will be given on the assumption that a "global destination" indicates the communication apparatus 10 that is the final destination of a frame. The distributing unit 41 outputs a data frame to the registration unit 43 when the global destination address of the data frame is identical with an address allocated to the communication apparatus 10 that includes this distributing unit 41. Meanwhile, the distributing unit 41 outputs a data frame to the obtaining unit 44 when the global destination address of the data frame is not identical with the address allocated to the communication apparatus 10 that includes this distributing unit 41.

Using a Hello frame input from the distributing unit 41, the updating unit 42 updates the routing table 51. That is, the updating unit 42 stores in the routing table 51 data, such as a global destination address stored in the Hello frame, the address of the source of the Hello frame, and a communication quality. In addition, when the updating unit 42 newly registers in the routing table 51 a route to a GD reported by the Hello frame, the updating unit 42 checks whether the registered route to the GD is registered in the registration table 52. When the route to the GD registered in the routing table 51 is included in the registration table 52, the updating unit 42 deletes the route to the GD from the registration table 52.

Figure 3:
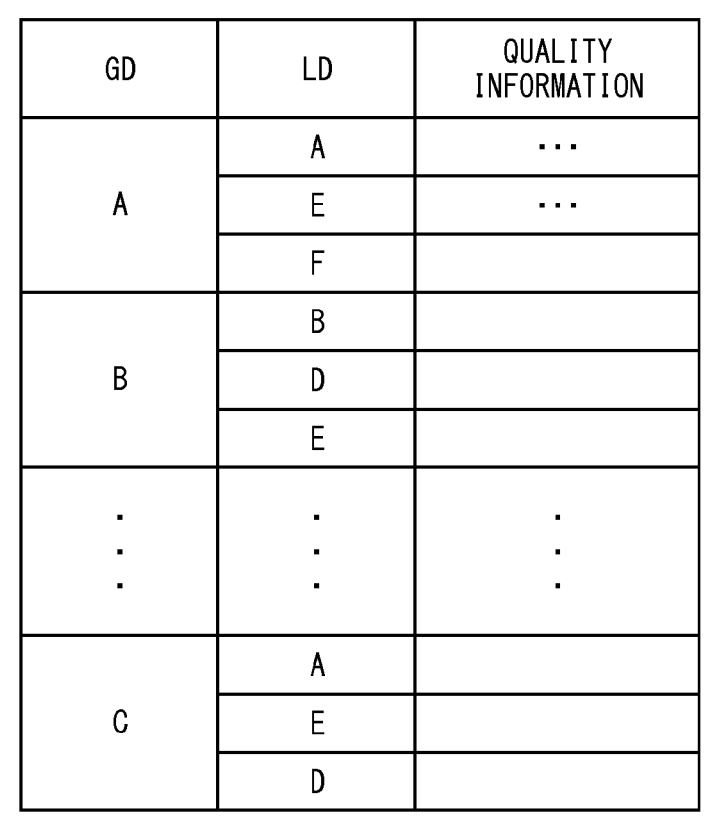

FIG. 3 illustrates an example of the routing table 51. The routing table 51 includes a global destination address, a local destination (LD) address, and quality information. Meanwhile, the "local destination" indicates a communication apparatus 10 designated as a destination of a one-hop transfer that is performed to transmit a frame to the global destination. As an example, when the communication apparatus f in FIG. 1A transmits a data frame to the communication apparatus g via the communication apparatus b, the communication apparatus g is a global destination. In this case, the communication apparatus f transmits to the communication apparatus b the data frame to be transmitted to the communication apparatus g, and the communication apparatus b transfers the data frame to the communication apparatus g. Thus, in the transfer of a data frame from the communication apparatus f to the communication apparatus b, the local destination is the communication apparatus b, and the global destination is the communication apparatus g. Meanwhile, when the communication apparatus b transmits a data frame to the communication apparatus g, the communication apparatus b sets the communication apparatus g as both the local destination and the global destination.

The reporting unit 33 generates and outputs a Hello frame to the frame-transmission processing unit 34. The reporting unit 33 may generate a Hello frame that includes information related to a route included in the routing table 51. Since a communication quality such as the number of hops are not identified for a route included in the registration table 52, the reporting unit 33 does not incorporate information of the registration table 52 in a Hello frame.

FIG. 4 illustrates an exemplary configuration of a Hello frame. The Hello frame includes an ad-hoc header and a payload. The payload includes a Hello message header and a signature. The payload may also include arbitrary number of Hello headers. The ad-hoc header includes a local destination address, a local source (LS) address, a frame type, a reserve, and a frame size. The "local source" (LS) indicates a communication apparatus 10 that is a source of a transfer within one-hop range. The Hello message header includes a service type, division information, the number of Hello headers, a bias, a time that has elapsed after activation of the apparatus, and an access key. The Hello header includes a global destination address, the number of hops, GW pass information, a route quality weight, and a return-route-quality weight. The updating unit 42 registers each global destination address within a Hello header in the routing table 51 as a global destination address (GD). In addition, the updating unit 42 registers a local source address of a Hello frame in the routing table 51 as a local destination address (LD) that is associated with a global destination address included in the same Hello frame.

The routing table 51 may record one or more local destinations for one global destination. As an example, as illustrated in FIG. 3, the routing table 51 may associate three or fewer local destinations with one global destination and store these destinations. Moreover, for each combination of a global destination and a local destination, the routing table 51 may record information indicating the quality of a pass, e.g., the number of hops and the strength of received radio waves. Kinds of information included in quality information and the number of kinds of information included in the quality information are selected in accordance with an implementation.

Figure 5:
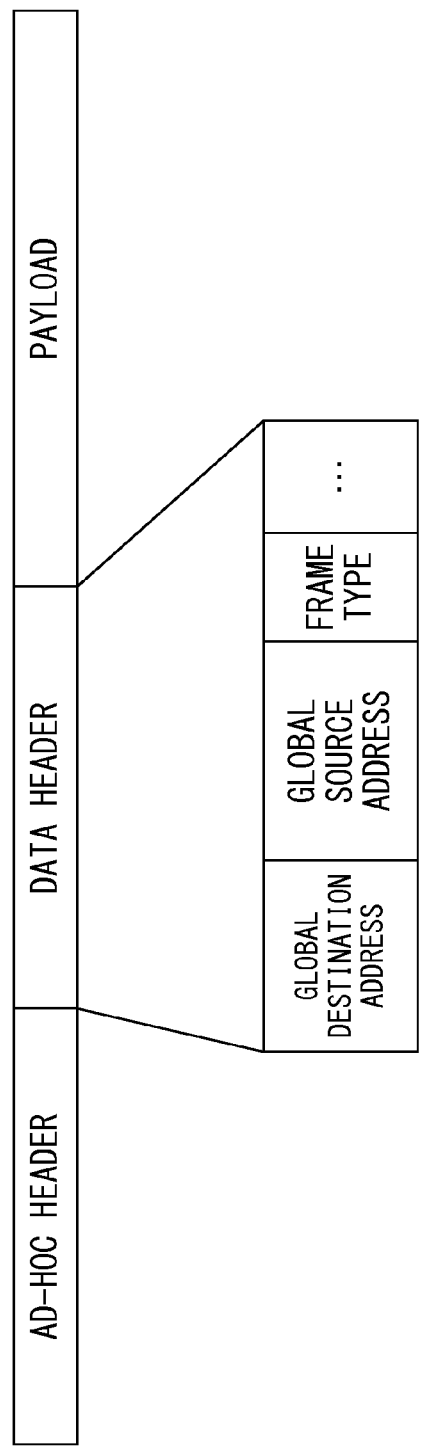
FIG. 5 illustrates an example of a data frame.

FIG. 5 illustrates an example of a data frame. The data frame includes an ad-hoc header, a data header, and a payload. The ad-hoc header includes information elements similar to those of an ad-hock header of a Hello frame. The data header includes information elements such as a global destination address, a global source address (GS), and a frame type of the frame. The global source address is an address of the communication apparatus 10 that has generated the data frame (a source address). The frame type indicates a kind of data included in the payload.

Figure 6:
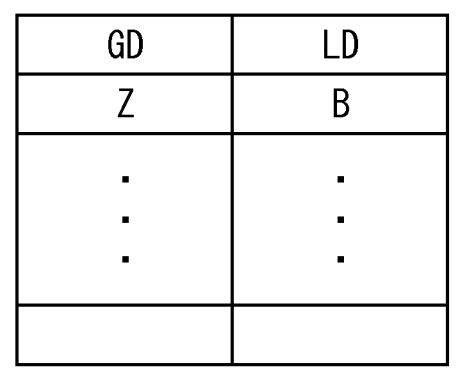

The registration unit 43 checks whether a global source address of a data frame input from the distributing unit 41 is registered as a GD in the routing table 51. When the global source address is not registered as a GD, the registration unit 43 registers this global source address in the registration table 52 as a GD. In addition, the registration unit 43 registers a local source address obtained from an ad-hoc header of the data frame in the registration table 52 as a local destination address (LD) that is associated with the global source address. FIG. 6 illustrates an example of the registration table 52. Completing the registering in the registration table 52, the registration unit 43 outputs the data frame to the application processing unit 32. The output of the data frame from the registration unit 43 to the application processing unit 32 causes the data frame to be processed at the communication apparatus 10 designated as the global destination.

Meanwhile, a data frame addressed to another communication apparatus is input to the obtaining unit 44. The obtaining unit 44 references the routing table 51 so as to search for a transfer destination of the data frame input from the distributing unit 41. That is, using the global destination address of the data frame as a key, the obtaining unit 44 searches the GD fields of the routing table 51 and searches for an LD associated with the global destination address of the data frame. When a GD is registered in the routing table 51, the obtaining unit 44 records an address associated with the GD in the local destination address of the ad-hoc header of the data frame. When a plurality of LDs associated with one GD are recorded, the obtaining unit 44 selects a communication apparatus 10 that is a transfer destination using a preset method, and registers the address of the selected communication apparatus 10 as a local destination address.

Meanwhile, when a GD is not registered in the routing table 51, the obtaining unit 44 checks whether a GD is registered in the registration table 52. When a GD is registered in the registration table 52, the obtaining unit 44 sets an LD associated with the GD as a transfer destination. Accordingly, the address of the LD that is the transfer destination is set as a local destination address of the ad-hoc header. In addition, the obtaining unit 44 records an address allocated to the communication apparatus 10 that includes this obtaining unit 44 as a local source address of the ad-hoc header. After setting the ad-hoc header, the obtaining unit 44 outputs the data frame to the frame-transmission processing unit 34.

The frame-transmission processing unit 34 converts the frame input from the obtaining unit 44 into a signal transmittable from the transmitter 22. The transmitter 22 transmits the signal input from the frame-transmission processing unit 34 to the destination of the frame. For example, the transmitter 22 broadcasts a route information frame. The timer 55 is used to measure, for each route included in the routing table 51 or the registration table 52, the time that has elapsed after the route was used most recently.

Figure 7:
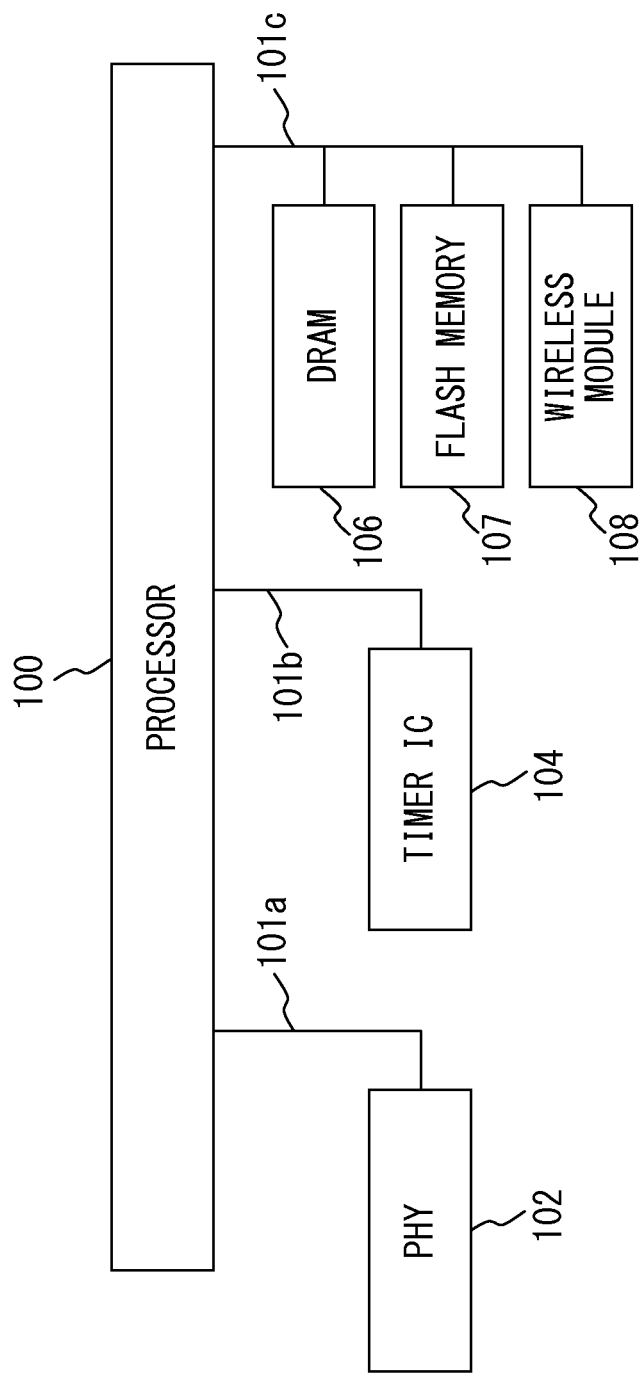
FIG. 7 illustrates an exemplary hardware configuration of a communication apparatus.

FIG. 7 illustrates an exemplary hardware configuration of a communication apparatus. The communication apparatus 10 includes a processor 100, buses 101 (101a to 101c), a physical layer (PHY) chip 102, a timer IC (Integrated Circuit) 104, a dynamic random access memory (DRAM) 106, a flash memory 107, and a wireless module 108. The buses 101a to 101c are connected in a manner such that data can be input to and output from the processor 100, the PHY chip 102, the timer IC 104, the DRAM 106, the flash memory 107, and the wireless module 108.

The processor 100 reads and processes a program such as firmware stored in the flash memory 107. Here, the processor 100 may use the DRAM 106 as a working memory. The processor 100 is operated as the controlling unit 30. The DRAM 106 is operated as the storage unit 50. The PHY chip 102 and the wireless module 108 are operated as the interface unit 20. The PHY chip 102 is an option, and the communication apparatus 10 may perform a line communication via the PHY chip 102. As an example, a communication apparatus 10 that is operated as a gateway between an L3 network and an ad-hoc network may communicate with a communication apparatus within the L3 network using the PHY chip 102. The timer IC 104 is operated as the timer 55.

A program such as firmware, which may be provided by storing it in a computer-readable storage medium, may be installed in the communication apparatus 10. Alternatively, the program may be installed in the communication apparatus 10 by downloading it from a network via the PHY chip 102 and the wireless module 108. In accordance with an embodiment, another type of storage apparatus that is different from the DRAM 106 or the flash memory 107 may be utilized.

<First Embodiment>

For simplicity, the following descriptions are based on the assumption that the communication apparatus 10 receives a Hello frame or a frame that includes user data (a data frame). Assume that route information frames are Hello frames.

FIG. 8A illustrates an exemplary network to which a first embodiment is applicable. The network illustrated in FIG. 8A includes a network server 61, an L3 network 62, and communication apparatuses 10 attempting to participate in the ad-hoc network. Seven communication apparatuses 10, which are a GW (gateway) and N1 to N6, have participated in the ad-hoc network illustrated in FIG. 8A. Although FIG. 8A depicts an ad-hoc network that includes seven communication apparatuses 10, the ad-hoc network may include any number of communication apparatuses 10. In the following, descriptions will be given of operations of the communication apparatuses 10 with reference to an exemplary situation of the network depicted in FIG. 8A in which the GW, N2, and N6 transmit a Hello frame, and a data frame addressed to the GW is then transmitted from N6.

First, descriptions will be given of operations performed when the GW broadcasts a Hello frame. The reporting unit 33 of the GW generates and broadcasts a Hello frame via the frame-transmission processing unit 34 and the transmitter 22. At this moment, since the GW does not store information related to a node adjacent to the GW, the reporting unit 33 generates a Hello frame that does not include a Hello header.

As illustrated in FIG. 8B, the transmitted Hello frame is received by the N1 to N3, which are nodes adjacent to the GW.

When the Hello frame is received by the N1, the distributing unit 41 of the N1 obtains the Hello frame via the receiver 21 and the frame-reception processing unit 31. The distributing unit 41 references a frame type field included in the ad-hoc header of the Hello frame and recognizes that the received frame is a Hello frame. The distributing unit 41 outputs the Hello frame to the updating unit 42.

The updating unit 42 of the N1 references a local source address of the input Hello frame and recognizes that the local source address of the Hello frame is the GW. The updating unit 42 also recognizes that a Hello header is not included in the Hello frame. Accordingly, the fact that the frame is transmittable to the GW by one-hop is reported to the updating unit 42, and the updating unit 42 determines that information related to another communication apparatus 10 within the ad-hoc network has not been reported. As a result, the updating unit 42 records in the routing table 51 information indicating that the number of hops is 1 for a situation in which the GW is both a GD and an LD. That is, the updating unit 42 updates the routing table 51 of the N1, as illustrated in FIG. 8C. The processes performed by the updating unit 42 allow the N1 to transmit to the GW a frame addressed to the GW.

Processes similar to those performed in the N1 are performed in the N2 and the N3, and the routing tables 51 are updated as illustrated in FIG. 8C. These processes also allow the N2 and the N3 to transmit to the GW a frame addressed to the GW.

Figures 9A, 9B, 9C, 9D:
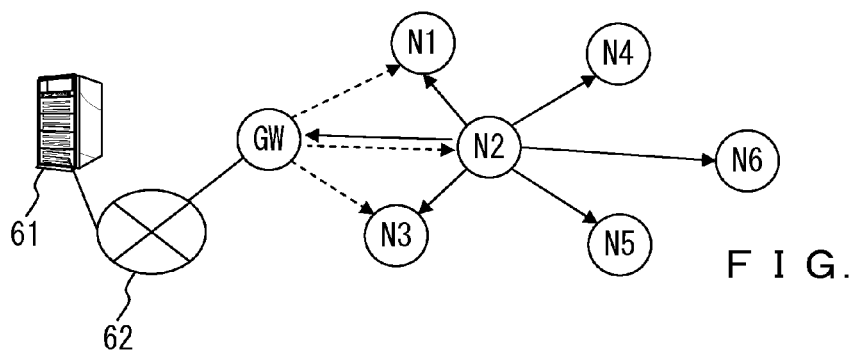
FIG. 9A illustrates an example of a communication apparatus that receives a Hello frame.
FIG. 9B illustrates an example of a routing table.
FIG. 9C illustrates another example of a routing table.
FIG. 9D illustrates still another example of a routing table.

FIG. 9A to FIG. 9D illustrate examples of communication apparatuses that receive a Hello frame transmitted from the N2, and examples of a routing table. In this example, as illustrated in FIG. 9A, a Hello frame transmitted from the N2 is received by the N1, the N3 to the N6, and the GW. Dashed arrows in FIG. 9A indicate the routes generated by the transmission and reception of a Hello frame that was described with reference to FIG. 8A to FIG. 8C. The generated routes are oriented in the direction indicated by the arrows.

When the reporting unit 33 of the N2 generates a Hello frame, the routing table 51 of the N2 is updated as illustrated in FIG. 8C using the procedures described with reference to FIG. 8A to FIG. 8C. Accordingly, the reporting unit 33 of the N2 generates a Hello frame that includes a Hello header in which the address of the GW is designated in the global-destination-address field and 1 is designated in the number-of-hops field.

When a Hello frame is received by the N1, the distributing unit 41 of the N1 outputs the Hello frame to the updating unit 42. The updating unit 42 recognizes that a local source address of the Hello frame indicates the N2 and that the Hello frame includes a Hello header indicating the GW as a global destination. Accordingly, the updating unit 42 determines that a frame is transferrable to the N2 by one hop and, additionally, that a frame is transmittable to the GW via the N2. Since the number of hops is 1 for a Hello header in which the GW is set as a global destination, the updating unit 42 also recognizes that one hop is present on a route from the N2 to the GW. Thus, a frame is transmitted from the N1 to the GW via the N2 by two hops. Accordingly, the updating unit 42 records in the routing table 51 the fact that the number of hops is 2 for a situation in which the GW is a GD and the N2 is an LD, and the fact that the number of hops is 1 for a situation in which the N2 is a GD and the N2 is an LD. As a result, the routing table 51 of the N1 is updated as illustrated in FIG. 9B. The N3 performs similar processes, and the routing table 51 of the N3 is also updated as illustrated in FIG. 9B.

As with the updating unit 42 of the N1, upon receipt of a Hello frame transmitted from the N2, the updating unit 42 of the N4 to the N6 also records in the routing table 51 the fact that the number of hops is 2 for a situation in which the GW is a GD and the N2 is an LD, and the fact that the number of hops is 1 for a situation in which the N2 is a GD and the N2 is an LD. Accordingly, the routing table 51 of the N4 to the N6 is updated as illustrated in FIG. 9C.

Upon receipt of a Hello frame transmitted from the N2, the updating unit 42 of the GW also recognizes that the number of hops is 1 for a situation in which the N2 is a GD and the N2 is an LD, and updates the routing table 51 as illustrated in FIG. 9D.

Figures 10A, 10B, 10C:
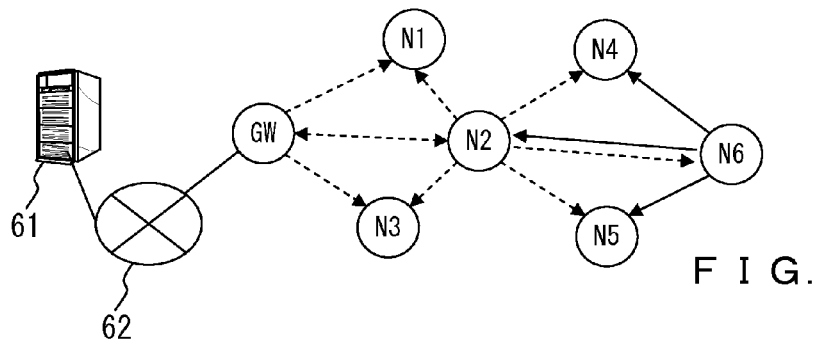
FIG. 10A illustrates an example of a communication apparatus that receives a Hello frame.
FIG. 10B illustrates an example of a routing table.
FIG. 10C illustrates another example of a routing table.

With reference to FIG. 10A to FIG. 10C, descriptions will be given of an exemplary communication apparatus that receives a Hello frame broadcasted by the N6 and of exemplary routing tables. Dashed arrows in FIG. 10A indicate routes generated by the Hello frames transmitted and received in FIG. 8A to FIG. 9D.

Assume that a Hello frame broadcasted by the N6 includes a Hello header that indicates information of a route from the N6 to the GW, and a Hello header that indicates information of a route from the N6 to the N2. As illustrated in FIG. 10A, the N2, the N4, and the N5 have received a Hello frame transmitted from the N6. In this case, the routing table 51 of the N2 is updated as illustrated in FIG. 10B, and the routing table 51 of the N4 and the N5 is updated as illustrated in FIG. 10C.

FIG. 11 illustrates an exemplary situation in which data frames are transmitted and received between communication apparatuses 10. With reference to FIG. 11, descriptions will be given of a situation in which a data frame is transmitted and received between the N6 and the GW after the transmission and reception of a Hello frame that was described with reference to FIG. 8A to FIG. 10C is performed. Note that the following procedures (1) to (8) correspond to the procedures (1) to (8) in FIG. 11.

(1) First, the application processing unit 32 of the N6 generates a data frame D1 addressed to the GW. The address of the GW and the address of the N6 are set as a global destination address and a global source address of this data frame, respectively. In this example, the application processing unit 32 outputs the generated data frame to the obtaining unit 44. The obtaining unit 44 of the N6 detects from the routing table 51 an LD associated with the global destination address included in a data header of the data frame D1. The routing table 51 of the N6 has been updated as illustrated in FIG. 9C, so the obtaining unit 44 recognizes that the data frame D1 is transmittable to the GW via the N2. Accordingly, the obtaining unit 44 of the N6 sets the address of the N2 and the address of the N6 as an LD and an LS of the ad-hoc header of the data frame D1, respectively.

(2) When the data frame D1 is received by the N2, the data frame D1 is input to the distributing unit 41 of the N2. The distributing unit 41 references the ad-hoc header and the data header of the data frame D1, thereby recognizing that the data frame D1 is a data frame and that the global destination of the data frame D1 is not the N2. Accordingly, the distributing unit 41 outputs the data frame D1 to the obtaining unit 44. The obtaining unit 44 of the N2 references the routing table 51 (FIG. 10B) so as to determine a transfer destination of the data frame D1. In this example, the obtaining unit 44 selects the GW as a transfer destination, so the data frame D1 is transmitted from the N2 to the GW.

(3) When the data frame D1 is received by the GW, this data frame is input to the distributing unit 41 of the GW. The distributing unit 41 references the ad-hoc header and the data header, thereby recognizing that the data frame D1 is a data frame addressed to the GW. Accordingly, the distributing unit 41 outputs the data frame D1 to the registration unit 43.

The registration unit 43 checks whether the address of the global source (the N6) of the data frame D1 is registered in the routing table 51 (FIG. 9D). As illustrated in FIG. 9D, the address of the N6 is not recorded in the routing table of the GW. Accordingly, the registration unit 43 associates the address of the N6 with the address of the transfer-source N2 and then registers in the registration table 52 of the GW. FIG. 11 depicts an example of the registration table 52 of the GW that has been updated in accordance with a process performed by the obtaining unit 44.

(4) Next, assume that the GW transmits a data frame D2 to the N6. The data frame D2 generated by the application processing unit 32 of the GW is input to the obtaining unit 44 of the GW. In this example, the N6 and the GW are set as a global destination and a global source of the data frame D2, respectively.

The obtaining unit 44 references the data header of the data frame D2, thereby recognizing that the global destination is the N6. The obtaining unit 44 checks whether a route to the N6 is recorded in the routing table 51. As illustrated in FIG. 9D, a route to the N6 is not recorded in the routing table 51 of the GW. Accordingly, the obtaining unit 44 checks whether a route to the N6 is registered in the registration table 52. The registration table 52 of the GW records information indicating that the N2 is an LD when the N6 is a GD, as illustrated in FIG. 11. Accordingly, the obtaining unit 44 sets the N2 as a local destination of the data frame D2 and then transmits the data frame D2 to the N2.

(5) The N2 receives the data frame D2. The data frame D2 is judged by the distributing unit 41 of the N2 to be a data frame addressed to the N6. Accordingly, the distributing unit 41 outputs the data frame D2 to the obtaining unit 44. The obtaining unit 44 of the N2 references the routing table 51 (FIG. 10B) and transmits the data frame D2 to the N6.

(6) The N6 receives the data frame D2 from the N2.

(7) Next, assume that the N5 broadcasts a Hello frame that includes a route from the N5 to the N6, and that the N3 receives the Hello frame transmitted from the N5. The N3 obtains route information of a route to the N6 using a method similar to the method described with reference to FIG. 8A to FIG. 10C. Further assume that the N3 broadcasts a Hello frame that includes a Hello header indicating a route from the N3 to the N6 and that the GW receives the Hello frame transmitted from the N3.

(8) The distributing unit 41 of the GW outputs to the updating unit 42 the Hello frame transmitted from the N3. According to the Hello frame received from the N3, the updating unit 42 records a route to the N3 and a route to the N6 in the routing table 51. FIG. 11 depicts the routing table 51 of the GW after the change. In addition, the updating unit 42 deletes the route to a GD newly registered in the routing table 51 from among the routes registered in the registration table 52.

Figure 12:
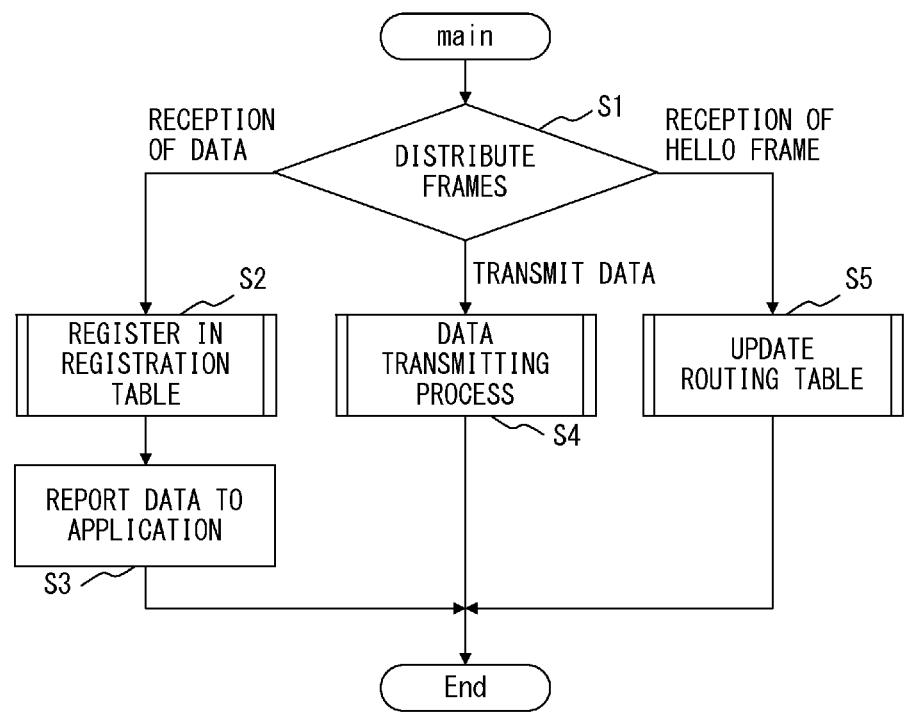
FIG. 12 is a flowchart illustrating an example of a frame process performed by a communication apparatus.

FIG. 12 is a flowchart illustrating an example of a frame process performed by a communication apparatus 10. The distributing unit 41 distributes frames received by the communication apparatus 10 by changing the output destination of these frames in accordance with their type and destination (step S1). The distributing unit 41 determines that a data frame addressed to the communication apparatus 10 that includes this distributing unit 41 is an object to be registered in the registration table 52, and outputs this data frame to the registration unit 43. The registration unit 43 associates a global source address and a local source address, both included in the data frame input from the distributing unit 41, with each other and registers these addresses in the registration table 52 (step S2). In addition, the registration unit 43 outputs to the application processing unit 32 data included in the data frame after the registration (step S3). The application processing unit 32 performs a process according to the data reported in step S3.

A data frame judged by the distributing unit 41 to be addressed to another communication apparatus 10 is an object to be transferred. Accordingly, the registration unit 43 outputs to the obtaining unit 44 the frame to be transferred, and the obtaining unit 44 performs a transferring process (step S4).

When a frame obtained by the communication apparatus 10 is judged to be a Hello frame, the distributing unit 41 outputs this frame to the updating unit 42. The updating unit 42 updates the routing table 51 according to the information of a route to one or more global addresses included in the Hello frame and the information of a source of the Hello frame (step S5).

FIG. 13 is a flowchart illustrating exemplary operations performed by a communication apparatus 10 so as to register route information in a registration table. FIG. 13 depicts the process of step S2 in detail. The registration unit 43 receives from the distributing unit 41a data frame indicating as a final destination the communication apparatus 10 that includes this registration unit 43 (step S11). The registration unit 43 checks whether a route indicating the global source address of the data frame as a GD is recorded in the routing table 51 (step S12). When a route indicating the global source address of the data frame as a GD is not recorded in the routing table 51, the registration unit 43 registers in the registration table 52 a route to the communication apparatus to which the global source address is allocated (step S13). In this case, the GD in the registration table 52 indicates the global source of the data frame (the GS of the data frame) and the LD of the registration table 52 indicates a local source of the data frame. Meanwhile, when a route indicating the global source address of the data frame as a GD is recorded in the routing table 51, the registration unit 43 ends the process for the frame (Yes in step S12).

Figure 14:
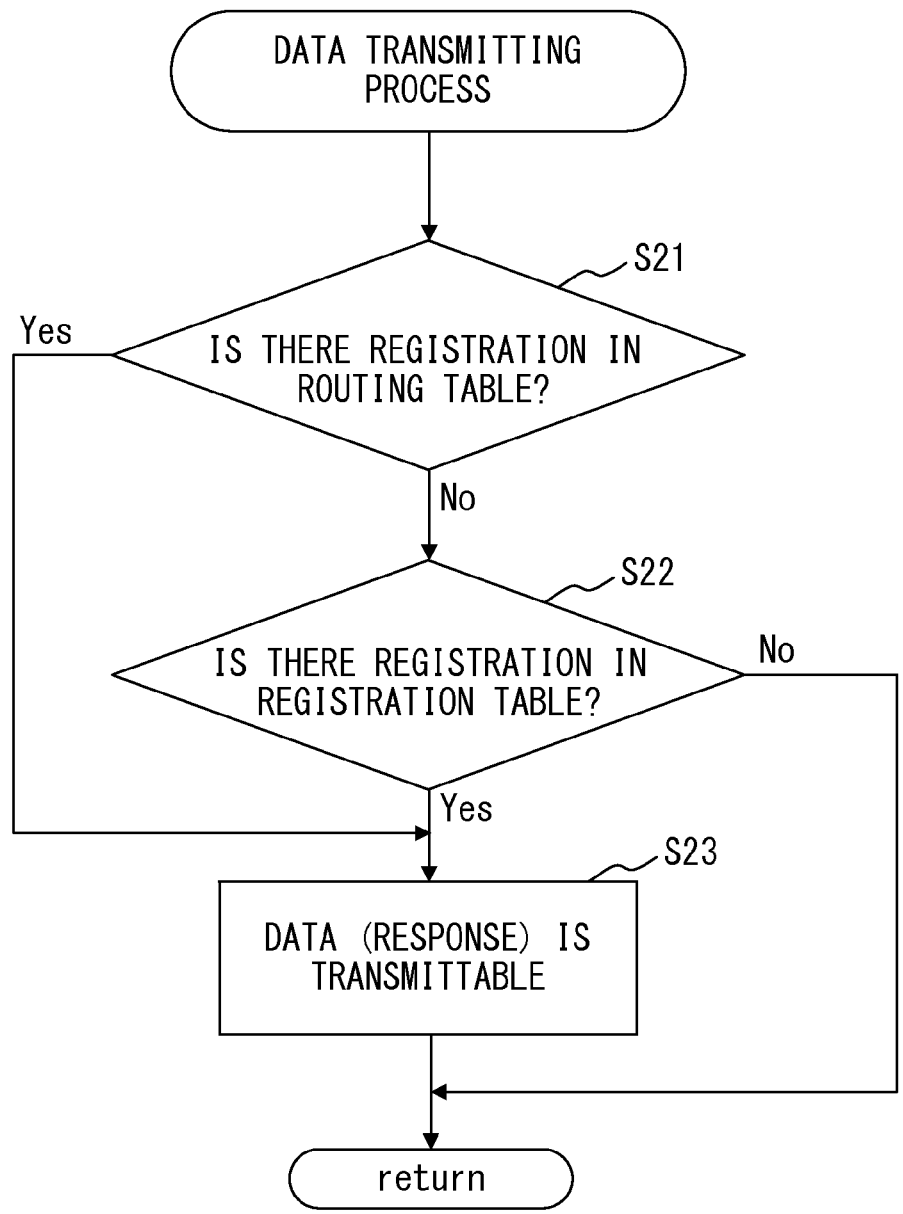
FIG. 14 is a flowchart illustrating an exemplary operation performed to transfer a data frame to another communication apparatus.

FIG. 14 is a flowchart illustrating an exemplary operation performed by the communication apparatus 10 so as to transfer a data frame to another communication apparatus. FIG. 14 depicts the process of step S4 in detail. The obtaining unit 44 checks whether a global destination of a frame input from the distributing unit 41 is registered in the routing table 51 (step S21). When the global destination is not registered in the routing table 51, the obtaining unit 44 checks whether the global destination is registered in the registration table 52 (No in step S21; step S22). When the global destination is registered in the registration table 52, the obtaining unit 44 determines that the data frame is transmittable, and transfers the data frame to an LD registered in the registration table 52 (step S23). When the global destination is registered in the routing table 51, the obtaining unit 44 also determines that the data frame is transmittable, and transfers the data frame to a registered LD associated with the destination of the frame (Yes in step S21; step S23). Meanwhile, when the global destination of the frame is not registered in the routing table 51 or the registration table 52, the obtaining unit 44 determines that the data is not transmittable, and discards the frame (No in step S22).

Figure 15:
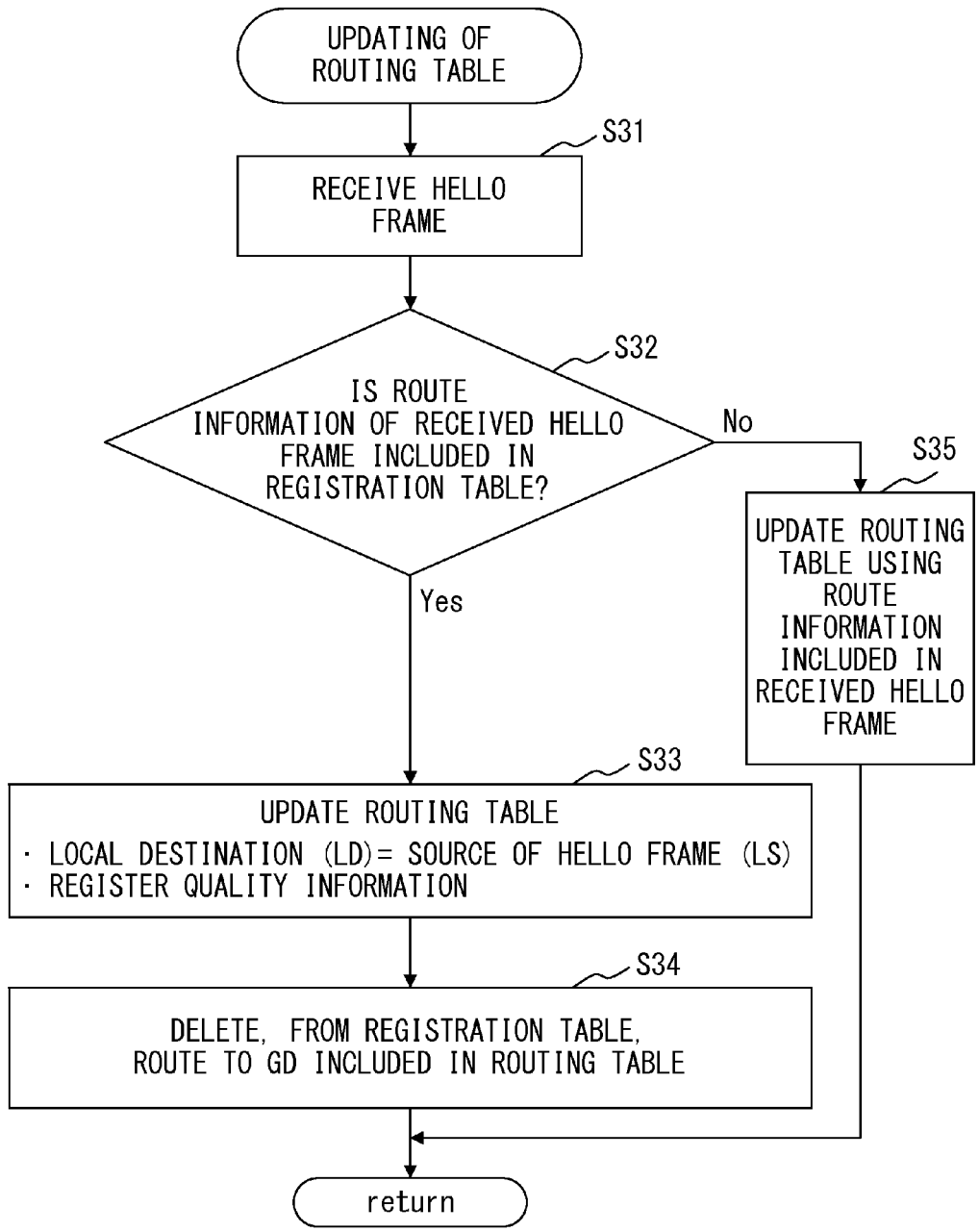
FIG. 15 is a flowchart illustrating an exemplary operation performed to update a routing table.

FIG. 15 is a flowchart illustrating an exemplary operation performed by the communication apparatus 10 so as to update a routing table. When the distributing unit 41 receives a Hello frame, the distributing unit 41 outputs this Hello frame to the updating unit 42 (step S31). The updating unit 42 checks whether route information included in the received Hello frame is registered in the registration table 52 (step S32). When the route information included in the Hello frame is included in the registration table 52, the updating unit 42 updates the routing table 51 using the route information recorded in the Hello frame (step S33). That is, the updating unit 42 sets a source of the Hello frame (an LS of the Hello frame) as an LD in the routing table 51 and sets a global destination included in the Hello header as a GD in the routing table 51. In addition, the updating unit 42 also registers quality information included in the Hello header in the routing table 51. Subsequently, the updating unit 42 deletes from the registration table 52 the information related to a route to the GD included in the routing table 51 (step S34). Meanwhile, when the route information included in the Hello frame is not included in the registration table 52, the updating unit 42 also updates the routing table 51 using the route information recorded in the Hello frame (step S35).

In this way, the communication apparatus 10 in accordance with the present embodiment may even transfer a frame to an address that is not registered in the routing table 51 according to the registration table 52 that records the information of sources (GSs) and transfer sources (LSs) of data frames. That is, the communication apparatus 10 may transmit a frame to a GS that has transmitted a data frame to this communication apparatus 10 at least once, even though the route information of a route to this GS is not reported to the communication apparatus 10. Thus, the communication apparatus 10 is less likely to fail to transfer a frame.

Particularly small wireless apparatuses with thin lines may simultaneously transmit or receive only a small amount of data, so the length of Hello frames is short. Thus, a number of Hello headers included in a Hello frame may be limited. Accordingly, it disadvantageously takes a long time for communication apparatuses participating in an ad-hoc network to obtain route information of the entire network from a Hello frame. However, in the ad-hoc network that includes the communication apparatus 10, the communication apparatus 10 may transmit a frame to the source of a data frame that was received by the communication apparatus 10 in the past, even before a route is completely constructed by a Hello frame. Thus, the ad-hoc network that includes the communication apparatus 10 makes it less likely that the transmitting of a frame will fail. Allowing the communication apparatus 10 to transmit a frame to the source of a received data frame enables, for example, a response frame for the data frame to be transmitted. Thus, it is possible to prevent the traffic within the network from increasing due to, for example, repetitive retransmissions of data frames.

<Second Embodiment>

A communication apparatus 10 in accordance with a second embodiment may include a routing table 70 that integrates the routing table 51 and the registration table 52.

Figure 16:
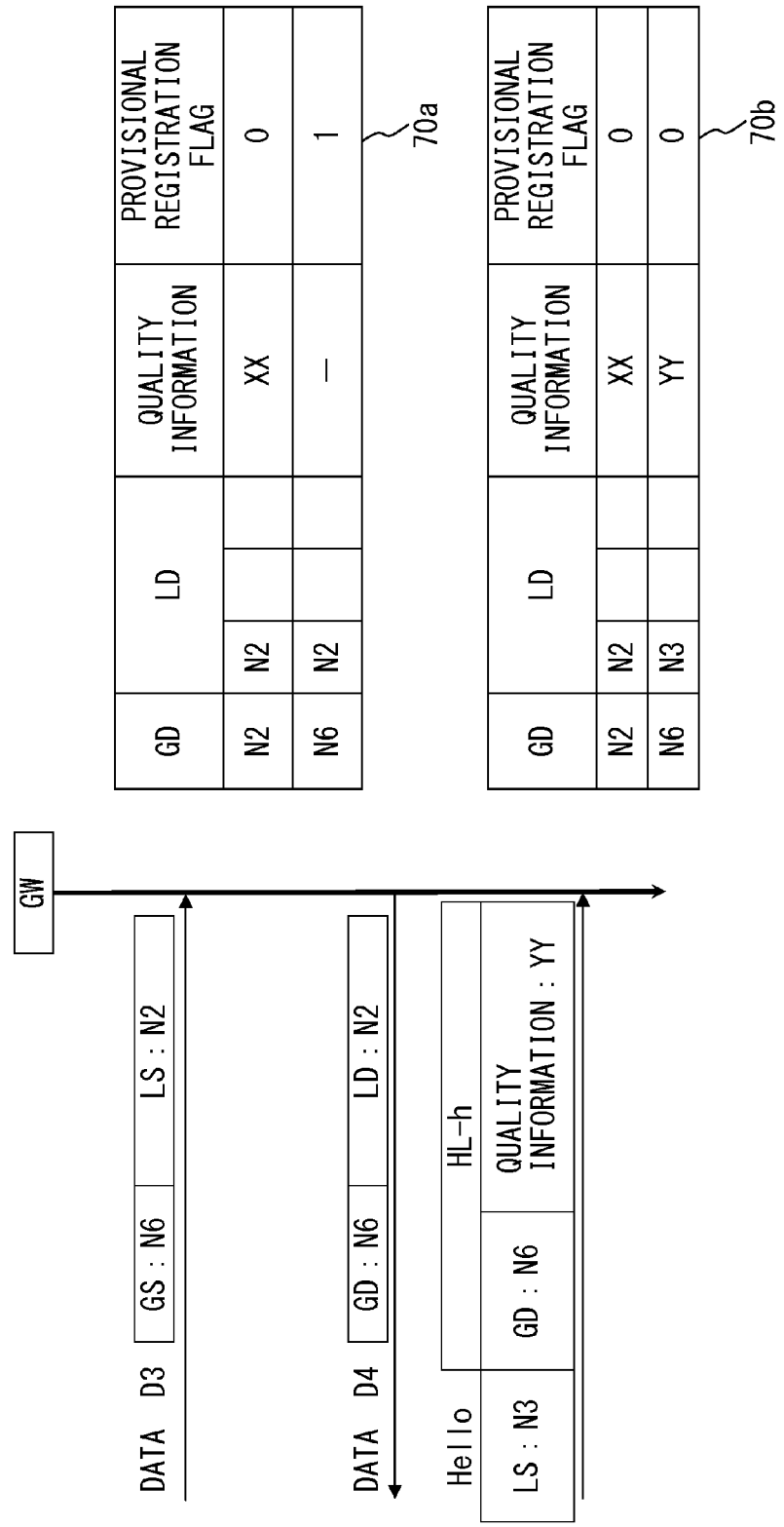
FIG. 16 illustrates an exemplary routing table and an exemplary method for updating a routing table.

FIG. 16 illustrates an example of the routing table 70 and an exemplary method for updating the routing table 70. The routing table 70 includes a global destination address, a local destination address, quality information, and a provisional registration flag. The provisional registration flag indicates whether a certain entry has been registered according to, for example, the source address of a data frame. For example, the registration unit 43 sets 1 to a provisional registration flag in the registering of the information of an address included in a data frame in the routing table 70. Meanwhile, the updating unit 42 sets 0 to a provisional registration flag in the registering of the route information included in a Hello frame in the routing table 70.

Assume that a data frame D3 transmitted from the N6 via the N2 and addressed to the GW has been received by the GW, as illustrated in the sequence in FIG. 16. The data frame D3 is output to the registration unit 43 using a method similar to the method that was described with reference to the first embodiment. The registration unit 43 checks whether a route to the N6, i.e., a route to the global source of the data frame D3, is recorded in the routing table 70. When a route to the N6 is not included in the routing table 70, the registration unit 43 sets the GS of the data frame D3 as a GD in the routing table 70 and registers the LS of the data frame D3 as an LD in the routing table 70. At this moment, since quality information is not included in the data frame D3, quality information is not recorded in the routing table 70. Additionally, the registration unit 43 sets "1" as a value of the provisional registration flag that corresponds to information registered according to the data frame D3. FIG. 16 depicts a routing table 70*a*, i.e., an updated routing table.

Next, assume that the GW transmits a data frame D4 to the N6. In this case, the data frame D4 generated by the application processing unit 32 is output to the obtaining unit 44, as described above with reference to the first embodiment. The obtaining unit 44 determines a transfer destination (an LD) of the data frame in accordance with the combination of a GD and an LD included in the routing table 70. In this example, as illustrated in the sequence of FIG. 16, the GD of the data frame D4 is the N6, and the LD of the data frame D4 is the N2.

Subsequently, assume that the GW has received a Hello frame broadcasted from the N3. Further assume that the Hello frame includes information of a route from the N3 to the N6. Accordingly, the Hello frame is output to the updating unit 42, as in the case of the first embodiment. Recognizing that the N6 is included in a GD of the Hello header, the updating unit 42 updates a route to the N6 included in the routing table 70*a*. In view of the fact that "1" is set to the provisional registration flag that corresponds to the route information of a route to the N6, the updating unit 42 recognizes that the route information of a route to the N6 is registered by the registration unit 43. Accordingly, the updating unit 42 changes the information of an LD registered as a route for which the N6 is indicated as a GD to the N3 that is the source of the Hello frame. The updating unit 42 also changes the provisional registration flag from "1" to "0". FIG. 16 depicts an example of a routing table 70*b*, i.e., an updated routing table.

In this way, in the embodiment, collecting the routing table 51 and the registration table 52 in one routing table 70 allows pieces of route information to be collectively managed.

<Third Embodiment>

Figures 17A, 17B:
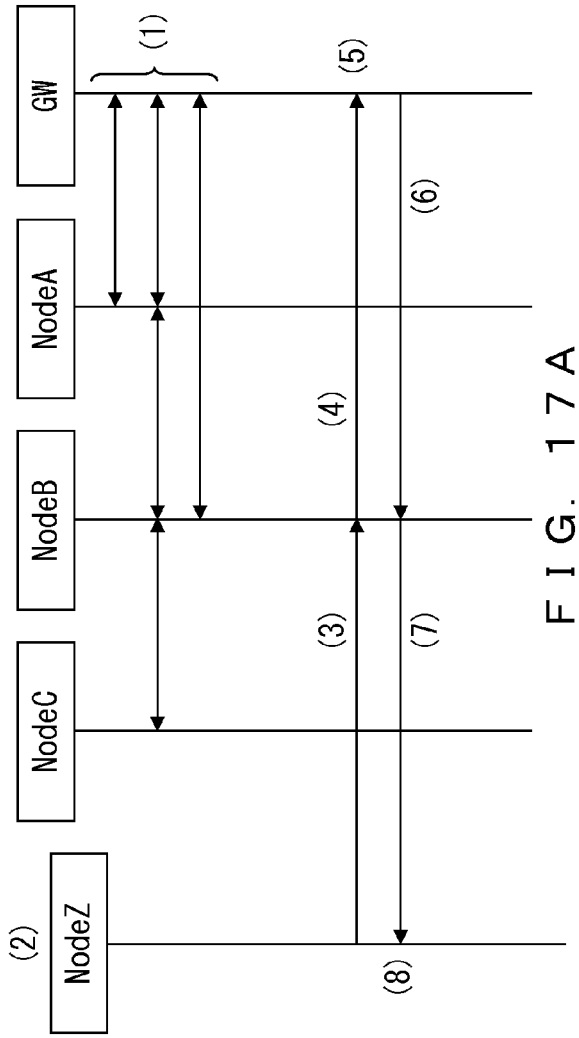
FIG. 17A illustrates an example of data transmission and reception between communication apparatuses within a network.
FIG. 17B illustrates an exemplary routing table.

FIG. 17A illustrates an example of data transmission and reception between communication apparatuses within a network. In the following, with reference to FIG. 17A, a third embodiment will be described in regard to an exemplary situation in which a new communication apparatus 10 has been added to a network. All of the communication apparatuses A to C and the communication apparatuses GW and Z, which will be described in the following example, are a communication apparatus 10.

(1) Assume that a network has been formed that includes the communication apparatuses A to C and the GW. Assume that routes in the network that includes the communication apparatuses A to C and the GW have been recorded, and that the routing table 51 of the communication apparatus GW has already stored the maximum storable number of routes. That is, the memories allocatable to the routing table 51 of the communication apparatus GW have been used up, so no more routes are storable. The following descriptions are based on the assumption that the GW stores the routing table 51 illustrated in FIG. 3.

(2) The communication apparatus Z receives a Hello frame broadcasted by the communication apparatus B. Assume that the Hello frame includes information that specifies a route from the communication apparatus B to the GW. Accordingly, the updating unit 42 of the communication apparatus Z obtains the Hello frame and records a route to the communication apparatus B and a route to the GW in the routing table 51 of the communication apparatus Z. In addition, the communication apparatus Z broadcasts a Hello frame. The updating unit 42 of the communication apparatus B obtains route information from the Hello frame transmitted from the communication apparatus Z and records a route to the communication apparatus Z in the routing table 51 of the communication apparatus B.

(3) When the communication apparatus Z generates a data frame D5 to be transmitted to the GW, the obtaining unit 44 of the communication apparatus Z references the routing table 51 so as to transmit the data frame D5 to the communication apparatus B.

(4) When the communication apparatus B receives the data frame D5, the data frame D5 is input to the obtaining unit 44 as described above with reference to the first embodiment. The obtaining unit 44 obtains from the routing table 51 a route to the GW designated as the global destination of the data frame D5, and changes the ad-hoc header of the data frame D5. Then, the data frame D5 is transmitted from the communication apparatus B to the GW.

(5) The GW receives the data frame D5. When the GW receives the data frame D5, the registration unit 43 of the GW references the routing table 51 so as to check whether a route to the global source is recorded. In this example, as illustrated in FIG. 3, a route to the communication apparatus Z is not registered in the routing table 51. Accordingly, as illustrated in FIG. 6, the registration unit 43 registers in the registration table 52 of the GW the communication apparatus Z as a GD and the communication apparatus B as an LD. In this procedure, the obtaining unit 44 and so on perform operations similar to those in the first embodiment.

(6) The GW generates a data frame D6 to be transmitted to the communication apparatus Z. Using the registration table 52, the obtaining unit 44 of the GW transmits the data frame D6 to the communication apparatus B. The operations performed in this procedure are also similar to those in the first embodiment.

(7) The communication apparatus B receives the data frame D6. The data frame D6 is input to the obtaining unit 44 of the communication apparatus B, and, using the routing table 51, the obtaining unit 44 transmits the data frame D6 to the communication apparatus Z. The operations performed in this procedure are also similar to those in the first embodiment.

(8) The communication apparatus Z receives the data frame D6.

The third embodiment may prevent a failure of the transmitting of a frame to a newly added communication apparatus 10.

Even when a route to a newly added communication apparatus is not stored in a memory allocated to the routing table 51 of the GW, the present embodiment allows a communication to be performed with the newly added communication apparatus by registering the route in the registration table 52. Many communication apparatuses within the ad-hoc network access a gateway (GW) that allows the communication apparatus 10 that has participated in the ad-hoc network to access the network server 61. Thus, the GW runs short of a memory for the routing table 51 more often than the communication apparatuses 10. The present embodiment also allows a communication to be performed with a communication apparatus that is newly added after a memory for the routing table 51 runs short. FIG. 17B illustrates an example of the routing table 51. In the example of FIG. 17B, in addition to GD and LD, the routing table 51 includes quality information such as a Time To Live (TTL) value, an inter-link arrival weight, the number of hops, a route quality weight, an evaluation value, and the strength of received radio waves. These pieces of quality information will be described hereinafter. Meanwhile, as illustrated in FIG. 6, the registration table 52 does not include quality information. Thus, even though the registration table 52 and the routing table 51 store the same number of pieces of route information, the registration table 52 requires a smaller memory capacity than the routing table 51 does.

In addition, the operation of the updating unit 42 may be modified in a manner such that a route selected from the routes already stored in the routing table 51 is deleted and such that the route registered in the registration table 52 is recorded in the routing table 51. When a Hello frame that reports a route registered in the registration table 52 is received, the address in the Hello frame is registered in the routing table 51.

Figure 18:
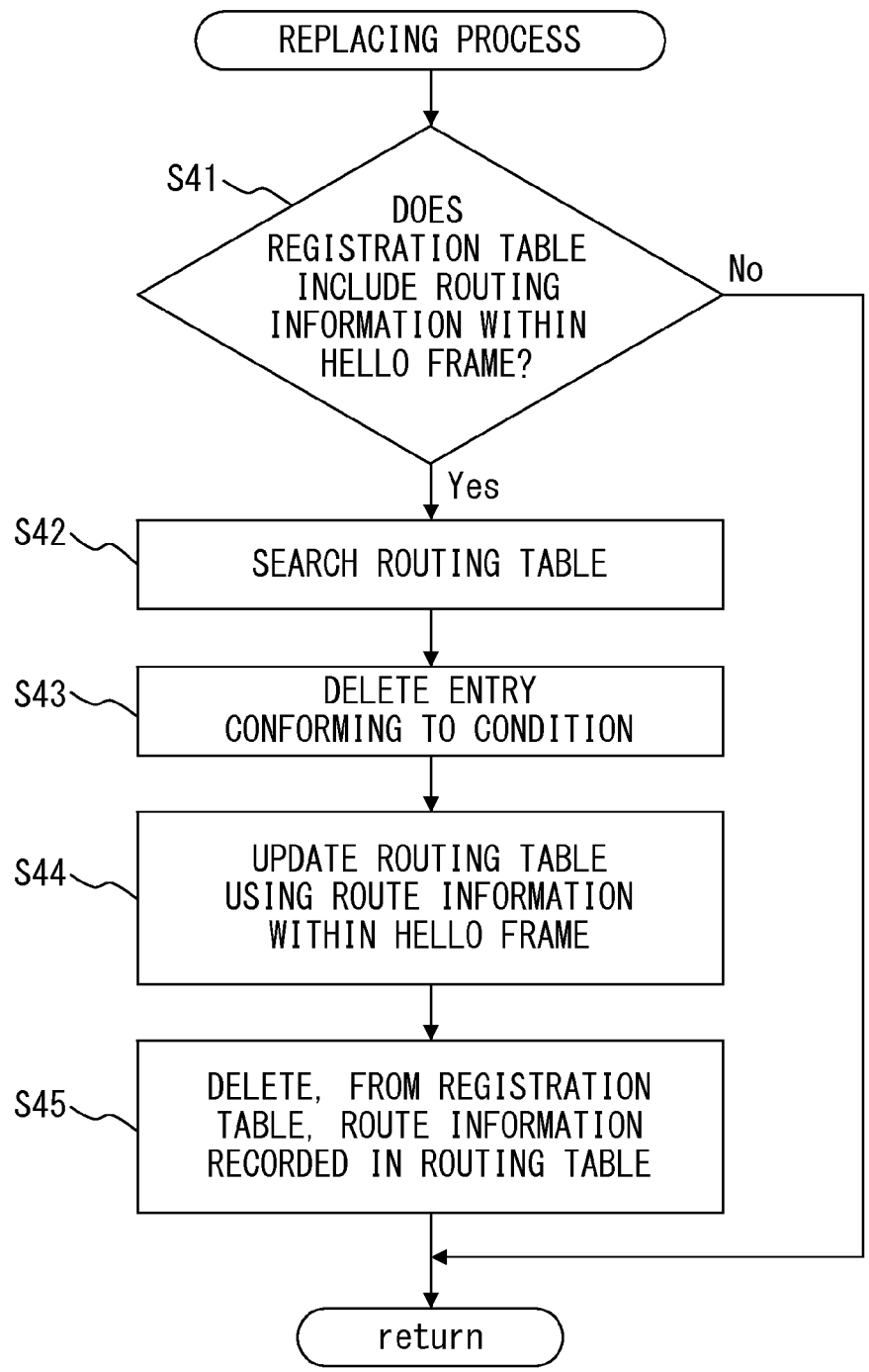
FIG. 18 is a flowchart illustrating an exemplary operation performed by an updating unit so as to change a routing table.

FIG. 18 is a flowchart illustrating an exemplary operation performed by the updating unit 42 so as to change the routing table 51. When a communication apparatus 10 has run short of a memory for the routing table 51 and a Hello frame is input from the distributing unit 41, the updating unit 42 examines whether route information included in the Hello frame is included in the registration table 52 (step S41). When the information of an address within the Hello frame is included in the registration table 52, the distributing unit 41 searches for route information to be deleted from the routing table 51 (step S42). The route information to be deleted is determined according to quality information. The TTL indicates the effective period of a route. The value of the TTL returns to an initial value every time a time route is used, and this value decreases with time. The inter-link arrival weight indicates the value of communication performance of the route. The route quality weight is a value obtained by summing up the inter-link arrival weights included in Hello frames over the entire region of the route. The evaluation value, which is calculated according to the inter-link arrival weight and route quality weight, indicates the communication quality of the route. For example, a route with a low evaluation value or a less-frequently used route is searched for as an object to be deleted from the routing table 51. In addition, an entry for which the TTL value is equal to or lower than a certain value is also an object to be deleted. When an entry to be deleted is included in the routing table 51, the updating unit 42 deletes this entry (step S43). Moreover, the route information included in the Hello frame is registered in the routing table 51 (step S44). In addition, the updating unit 42 deletes from the registration table 52 information related to the route registered in the routing table 51 (step S45).

As described above, the routing table 51 is updated as appropriated to replace the routes included in the routing table 51, so frequently used routes are included in the routing table 51.

<Other Items>

Embodiments are not limited to those described above, and various variations are possible. Some examples of the variations will be described in the following.

The communication apparatus 10 may transmit and receive a control frame that is not a Hello frame to and from, for example, another communication apparatus. In this case, assume that the distributing unit 41 outputs a Hello frame to the updating unit 42 and a frame that is not a Hello frame to the registration unit 43. When a frame that includes information of a source address is input, the registration unit 43 associates the source address and the address of a transfer source of the frame with each other and registers these addresses in the registration table 52. The distributing unit 41 distinguishes a Hello frame from a frame that is not a Hello frame according to the value of a frame type included in the ad-hoc header of the Hello frame.

Note that, as with the third embodiment, all of the embodiments that use the registration table 52, e.g., the first embodiment, allow a communication to be performed with a communication apparatus that is newly added after the memory runs short.

In addition, for information registered in the registration table 52, the operation of the registration unit 43 may be modified in a manner such that a TTL is recorded for each entry and the entry is replaced in accordance with the value of the TTL.

As described above, when the communication apparatus receives a frame from an apparatus that is not registered in the route information table, the communication apparatus registers the transfer source and the source of this frame in the registration table and uses these sources as route information. Thus, the transmitting of a frame to an apparatus for which a route is not registered in the route information table is less likely to fail.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication apparatus comprising:
  a receiver configured to receive a route information frame that reports route information of a network, and a first frame that includes user data, the first frame having a destination address identical with an address allocated to the communication apparatus;
  a memory configured to hold a route information table that records route information included in the route information frame;
  a processor configured to:
    when the route information table does not include a global source address of the first frame, register the global source address and a local source address in a registration table, the local source address being an address of a transfer-source apparatus that has transferred the first frame to the receiver by one hop, the global source address being an address of another communication apparatus that has generated the first frame, and when the communication apparatus transmits a second frame addressed to a destination apparatus that is not recorded in the route information table, obtain, from the registration table and as an address of a destination of a one-hop transfer performed to transmit the second frame, the local source address registered in association with an address of the destination apparatus; and a transmitter configured to transmit the second frame to the address obtained by the processor.

2. The communication apparatus according to claim 1, wherein during a period until an address of the other communication apparatus is registered in the route information table, in transmitting of the second frame to the other communication apparatus, the processor searches for, from the registration table, a communication apparatus that is capable of transferring the second frame to the other communication apparatus.

3. The communication apparatus according to claim 1, wherein the processor updates the route information table according to the route information frame, the route information frame reports an address of a transfer-destination apparatus to which the communication apparatus that has generated the route information frame is capable of transferring the second frame, the processor associates the address of the transfer-destination apparatus with an address of the communication apparatus that has generated the route information frame, and registers, in the route information table, the address of the transfer-destination apparatus and the address of the communication apparatus that has generated the route information frame, and when the address of the transfer-destination apparatus is registered in the registration table, the processor deletes, from the registration table, the address of the transfer-destination apparatus and the address associated with the address of the transfer-destination apparatus.

4. The communication apparatus according to claim 1, wherein the registration table records information that indicates a time that has elapsed after registration of the global source address, and when a predetermined period of time has elapsed from a time at which the global source address was recorded, the processor deletes from the registration table the global source address and information associated with the global source address.

5. A communication method comprising:

checking whether a global source address of a received data frame is recorded in a route information table that records route information of a network, the checking being performed by a first communication apparatus which includes the route information table, the global source address being an address of another communication apparatus that has generated the data frame, the data frame having a destination address identical with an address allocated to the first communication apparatus;

when the global source address is not recorded, registering the global source address and a local source address in a registration table, the local source address being an address of a transfer-source apparatus that has transferred the data frame to the first communication apparatus by one hop;

in transmitting of a transmission frame addressed to a second communication apparatus that is not recorded in the route information table, determining whether an address of the second communication apparatus is registered in the registration table, the determining being performed by the first communication apparatus;

when the address of the second communication apparatus is registered in the registration table, obtaining, from the registration table and as an address of a destination of a one-hop transfer performed to transmit the transmission frame, the local source address registered in association with the address of the second communication apparatus; and transmitting the transmission frame to the local source address obtained by the obtaining, the transmitting being performed by the first communication apparatus.

* * * * *